(12) United States Patent
Cho et al.

(10) Patent No.: US 11,634,819 B2
(45) Date of Patent: Apr. 25, 2023

(54) SOLUTION COMPOSITION FOR STEEL SHEET SURFACE TREATMENT, ZINC-BASED PLATED STEEL SHEET SURFACE-TREATED WITH SAME, AND MANUFACTURING METHOD THEREFOR

(71) Applicants: POSCO, Pohang-si (KR); NOROO COIL COATINGS CO., LTD., Pohang-si (KR)

(72) Inventors: Soo-Hyoun Cho, Pohang-si (KR); Dae-Chul Bae, Pohang-si (KR); Dong-Yun Kim, Anyang-si (KR); Chang-Hyun Park, Ansan-si (KR)

(73) Assignees: POSCO, Pohang-si (KR); NOROO COIL COATINGS CO., LTD., Pohang-si (KR)

(*) Notice: Subject to any disclaimer, the term of this patent is extended or adjusted under 35 U.S.C. 154(b) by 0 days.

(21) Appl. No.: 17/731,862

(22) Filed: Apr. 28, 2022

(65) Prior Publication Data

US 2022/0261646 A1  Aug. 18, 2022

Related U.S. Application Data

(62) Division of application No. 16/309,667, filed as application No. PCT/KR2017/006168 on Jun. 14, 2017, now Pat. No. 11,346,003.

(30) Foreign Application Priority Data

Jun. 14, 2016  (KR) .................. 10-2016-0073752

(51) Int. Cl.
| | | |
|---|---|---|
| C23C 22/42 | (2006.01) | |
| C23C 2/06 | (2006.01) | |
| C23C 2/26 | (2006.01) | |
| C23C 2/40 | (2006.01) | |
| C23C 22/44 | (2006.01) | |
| C09D 5/08 | (2006.01) | |
| C23C 22/40 | (2006.01) | |
| C09D 5/10 | (2006.01) | |
| C22C 18/04 | (2006.01) | |
| C22C 18/00 | (2006.01) | |
| C23C 22/07 | (2006.01) | |
| G06N 20/20 | (2019.01) | |
| G06N 3/04 | (2023.01) | |
| G06N 3/08 | (2023.01) | |
| G06T 11/00 | (2006.01) | |

(52) U.S. Cl.
CPC .............. *C23C 22/42* (2013.01); *C09D 5/08* (2013.01); *C09D 5/10* (2013.01); *C22C 18/00* (2013.01); *C22C 18/04* (2013.01); *C23C 2/06* (2013.01); *C23C 2/26* (2013.01); *C23C 2/40* (2013.01); *C23C 22/07* (2013.01); *C23C 22/40* (2013.01); *C23C 22/44* (2013.01); *G06N 3/0454* (2013.01); *G06N 3/08* (2013.01); *G06N 20/20* (2019.01); *G06T 11/00* (2013.01); *C23C 2222/10* (2013.01); *C23C 2222/20* (2013.01)

(58) Field of Classification Search
CPC .. C23C 22/42; C23C 2/06; C23C 2/26; C23C 2/40; C23C 22/07; C23C 22/44; C23C 2222/10; C23C 2222/20
See application file for complete search history.

(56) References Cited

U.S. PATENT DOCUMENTS

| | | | |
|---|---|---|---|
| 5,366,567 A | 11/1994 | Ogino et al. | |
| 2007/0023104 A1* | 2/2007 | Yamamoto | C23C 22/53 |
| | | | 148/266 |
| 2007/0243397 A1* | 10/2007 | Ludwig | C23C 22/34 |
| | | | 428/472.1 |
| 2014/0120368 A1 | 5/2014 | Warichet et al. | |
| 2015/0225856 A1* | 8/2015 | Roth | C23C 22/42 |
| | | | 428/336 |

FOREIGN PATENT DOCUMENTS

| | | |
|---|---|---|
| EP | 1992718 | 11/2008 |
| EP | 2540865 | 1/2013 |
| JP | 06173027 | 6/1994 |
| JP | 07054156 | 2/1995 |
| JP | 2002069660 | 3/2002 |
| KR | 20010057231 | 7/2001 |
| KR | 20040046347 | 6/2004 |
| KR | 20050052215 | 6/2005 |
| KR | 100535769 | 12/2005 |
| KR | 20060123628 | 12/2006 |
| KR | 20100106031 | 10/2010 |
| KR | 20150035343 | 4/2015 |

(Continued)

OTHER PUBLICATIONS

International Search Report—PCT/KR2017/006168 dated Sep. 14, 2017.

(Continued)

*Primary Examiner* — Hai Y Zhang
(74) *Attorney, Agent, or Firm* — Morgan, Lewis & Bockius LLP

(57) ABSTRACT

Provided is a solution composition for steel sheet surface treatment, comprising 30 wt % to 60 wt % of a trivalent chromium compound containing chromium phosphate (A) and chromium nitrate (B); 0.2 wt % to 0.4 wt % of a rust-inhibiting and corrosion-resisting agent; 0.1 wt % to 0.3 wt % of a molybdenum-based compound; 5 wt % to 10 wt % of a water-soluble cationic urethane resin; 0.5 wt % to 2.0 wt % of a silane coupling agent; and 27.3 wt % to 64.2 wt % of water, a zinc-based plated steel sheet surface-treated with the same, and a manufacturing method therefor, the zinc-based plated steel sheet surface-treated with the solution composition for steel sheet surface treatment containing trivalent chromium may have an excellent effect on corrosion resistance, blackening resistance, fingerprint resistance, oil resistance, and alkali resistance.

6 Claims, No Drawings

(56) References Cited

FOREIGN PATENT DOCUMENTS

| | | |
|---|---|---|
| KR | 20150073023 | 6/2015 |
| KR | 20150075001 | 7/2015 |
| WO | 9505247 | 2/1995 |

OTHER PUBLICATIONS

European Search Report—European Patent Application No. 17813574.5, dated Apr. 11, 2019.
U.S. Notice of Allowance dated Feb. 1, 2022 issued in U.S. Appl. No. 16/309,667.

* cited by examiner

SOLUTION COMPOSITION FOR STEEL SHEET SURFACE TREATMENT, ZINC-BASED PLATED STEEL SHEET SURFACE-TREATED WITH SAME, AND MANUFACTURING METHOD THEREFOR

CROSS-REFERENCE OF RELATED APPLICATIONS

This application is a Divisional patent application of U.S. patent application Ser. No. 16/309,667, filed on Dec. 13, 2018, which is the U.S. National Phase under 35 U.S.C. § 371 of International Patent Application No. PCT/KR2017/006168, filed on Jun. 14, 2017, which in turn claims the benefit of Korean Application No. 10-2016-0073752, filed on Jun. 14, 2016, the entire disclosures of which applications are incorporated by reference herein.

TECHNICAL FIELD

The present disclosure relates to a solution composition for steel sheet surface treatment containing trivalent chromium, a zinc-based plated steel sheet surface-treated with the solution composition, and a manufacturing method for the zinc-based plated steel sheet.

BACKGROUND ART

A high corrosion resistant molten plating material, forming a plated layer containing zinc (Zn), magnesium (Mg), and aluminum (Al), may be known as a steel material having excellent red rust corrosion resistance. However, the high corrosion resistant molten plating material may mostly be made of Zn or a Zn alloy on a surface to be exposed. Therefore, when exposed to a normal environment, especially a wet atmosphere, white rust may occur on the surface to easily deteriorate an appearance of the surface. In addition, Mg and Al in the high corrosion resistant molten plating material may be more hygroscopic than Zn. Therefore, there is a problem in which a surface color of high corrosion resistant molten plating material may be changed to black, i.e., a blackening phenomenon may easily occur, relative to conventional high corrosion resistant molten plating materials.

To solve such problems, conventionally, corrosion resistance and blackening resistance have been secured by applying hexavalent chromium or a chromate treatment to a plated steel sheet. However, since such hexavalent chromium has been designated as an environmentally hazardous substance, regulations for the use of hexavalent chromium are now being strengthened. Furthermore, when using hexavalent chromium as a surface treating agent for a plated steel sheet, there may be a problem in which a surface of the steel sheet is blackened, or black spots may be generated thereon.

Therefore, at present, a method of coating a surface treatment solution composition containing trivalent chromium on a steel sheet, to secure corrosion resistance and blackening resistance of a plated steel sheet, has been applied. For example, in patent publications Korean Patent Publication Nos. 10-2006-0123628, 10-2005-0052215, and 10-2009-0024450, corrosion resistance and blackening resistance properties are secured by a method in which a steel sheet may be immersed in a composition containing trivalent chromium to perform a chemical conversion treatment. However, there may be a problem in which it takes a relatively long time to immerse the steel in the continuous process of the steelmaker, and the chemical conversion treatment may have deteriorated fingerprint resistance, or the like.

In Korean Patent Publication No. 10-2004-0046347 and Japanese Patent Publication No. 2002-069660, a composition containing trivalent chromium may be coated on a steel sheet by a spray or roll coating method. Therefore, such methods may be applied in the continuous process of the steelmaker, and may have a fingerprint resistance. However, since the composition contains a porous silica component, it may be not suitable for Mg and Al alloys, which may be highly discolored in a relatively wet atmosphere. Further, since the porous silica has a high hygroscopic properties, a problem in which discoloration may rapidly occur in Mg, Al, and Zn alloy steel sheets, may occur.

DISCLOSURE

Technical Problem

An aspect of the present disclosure may provide a solution composition for steel sheet surface treatment, which may not contain hexavalent chromium, an environmentally hazardous substance, and which may contain trivalent chromium as a main component, harmless to the human body, and may provide a surface-treated zinc-based plated steel sheet, having an excellent effect on corrosion resistance, blackening resistance, fingerprint resistance, oil resistance, and alkali resistance, by applying the solution composition on a surface of a zinc-based plated steel sheet.

Technical Solution

According to an aspect of the present disclosure, a solution composition for steel sheet surface treatment includes: 30 wt % to 60 wt % of a trivalent chromium compound containing chromium phosphate (A) and chromium nitrate (B); 0.2 wt % to 0.4 wt % of a rust-inhibiting and corrosion-resisting agent; 0.1 wt % to 0.3 wt % of a molybdenum-based compound; 5 wt % to 10 wt % of a water-soluble cationic urethane resin; 0.5 wt % to 2.0 wt % of a silane coupling agent; and 27.3 wt % to 64.2 wt % of water.

In the solution composition for steel sheet surface treatment, the chromium phosphate (A) and the chromium nitrate (B) may satisfy a content ratio A/(A+B) of 0.3 to 0.6.

In the solution composition for steel sheet surface treatment, the rust-inhibiting and corrosion-resisting agent may be one or more selected from the group consisting of a fluorine-based rust inhibitor, a vanadium-based rust inhibitor, a cerium salt-based rust inhibitor, and a cobalt-based rust inhibitor.

In the solution composition for steel sheet surface treatment, the molybdenum-based compound may be one or more selected from the group consisting of molybdenum oxide, molybdenum sulfide, molybdenum acetate, molybdenum phosphate, molybdenum carbide, molybdenum chloride, molybdenum fluoride, and molybdenum nitride.

In the solution composition for steel sheet surface treatment, the silane coupling agent may be one or more selected from the group consisting of 2-(3,4-epoxycyclohexyl)-ethyl trimethoxysilane, 3-glycidoxypropyl trimethoxysilane, 3-glycidoxypropyl methyldiethoxysilane, 3-glycidoxypropyl triethoxysilane, N-2-(aminoethyl)-3-aminopropyl methyldimethoxysilane, N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, 3-ureidopropyl trimethoxysilane, and 3-ureidopropyl trialkoxysilane.

According to an aspect of the present disclosure, a surface-treated zinc-based plated steel sheet includes: a steel sheet; a zinc-based plated layer formed on at least one surface of the steel sheet; and a trivalent chromate film layer formed on the zinc-based plated layer, wherein the trivalent chromate film layer includes: 78.45 wt % to 82.3 wt % of a trivalent chromium compound containing chromium phosphate (A) and chromium nitrate (B); 1.69 wt % to 1.77 wt % of a rust-inhibiting and corrosion-resisting agent; 0.885 wt % to 1.265 wt % of a molybdenum-based compound; 10.125 wt % to 10.62 wt % of a urethane resin; and 4.425 wt % to 8.44 wt % of a silane coupling agent.

In the surface-treated zinc-based plated steel sheet, the chromium phosphate (A) and chromium nitrate (B) may satisfy a content ratio A/(A+B) of 0.89 to 0.95.

In the surface-treated zinc-based plated steel sheet, the rust-inhibiting and corrosion-resisting agent may be one or more selected from the group consisting of a fluorine-based rust inhibitor, a vanadium-based rust inhibitor, a cerium salt-based rust inhibitor, and a cobalt-based rust inhibitor.

In the surface-treated zinc-based plated steel sheet, the molybdenum-based compound may be one or more selected from the group consisting of molybdenum oxide, molybdenum sulfide, molybdenum acetate, molybdenum phosphate, molybdenum carbide, molybdenum chloride, molybdenum fluoride, and molybdenum nitride.

In the surface-treated zinc-based plated steel sheet, the silane coupling agent may be one or more selected from the group consisting of 2-(3,4-epoxycyclohexyl)-ethyl trimethoxysilane, 3-glycidoxypropyl trimethoxysilane, 3-glycidoxypropyl methyldiethoxysilane, 3-glycidoxypropyl triethoxysilane, N-2-(aminoethyl)-3-aminopropyl methyldimethoxysilane, N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, 3-ureidopropyl trimethoxysilane, and 3-ureidopropyl trialkoxysilane.

In the surface-treated zinc-based plated steel sheet, the zinc-based plated layer may be a zinc-magnesium-aluminum alloy layer.

In the surface-treated zinc-based plated steel sheet, the zinc-magnesium-aluminum alloy layer may include 1.5 wt % to 4 wt % of magnesium (Mg), 1 wt % to 3 wt % of aluminum (Al), a remainder of zinc (Zn), and unavoidable impurities.

In the surface-treated zinc-based plated steel sheet, the content of aluminum and magnesium may satisfy 2.5 wt % to 7.0 wt % of Al+Mg, and 0.38 to 0.48 of Al/(Al+Mg).

In the surface-treated zinc-based plated steel sheet, the trivalent chromate film layer may have a thickness of 0.3 μm to 0.5 μm.

According to an aspect of the present disclosure, a manufacturing method for a surface-treated zinc-based plated steel sheet, includes: coating a solution composition for steel sheet surface treatment on a zinc-based plated steel sheet on which a zinc-based plated layer is formed; and drying the coated solution composition for steel sheet surface treatment to form a trivalent chromate film layer, wherein the solution composition for steel sheet surface treatment includes: 30 wt % to 60 wt % of a trivalent chromium compound containing chromium phosphate (A) and chromium nitrate (B); 0.2 wt % to 0.4 wt % of a rust-inhibiting and corrosion-resisting agent; 0.1 wt % to 0.3 wt % of a molybdenum-based compound; 5 wt % to 10 wt % of a water-soluble cationic urethane resin; 0.5 wt % to 2.0 wt % of a silane coupling agent; and 27.3 wt % to 64.2 wt % of water.

In the manufacturing method for a surface-treated zinc-based plated steel sheet, the chromium phosphate (A) and chromium nitrate (B) may satisfy a content ratio A/(A+B) of 0.3 to 0.6.

In the manufacturing method for a surface-treated zinc-based plated steel sheet, the zinc-based plated layer may be a zinc-magnesium-aluminum alloy layer.

In the manufacturing method for a surface-treated zinc-based plated steel sheet, the zinc-magnesium-aluminum alloy layer may include 1.5 wt % to 4 wt % of magnesium (Mg), 1 wt % to 3 wt % of aluminum (Al), a remainder of zinc (Zn), and unavoidable impurities.

In the manufacturing method for a surface-treated zinc-based plated steel sheet, the content of aluminum and magnesium may satisfy 2.5 wt % to 7.0 wt % of Al+Mg, and 0.38 to 0.48 of Al/(Al+Mg).

In the manufacturing method for a surface-treated zinc-based plated steel sheet, the rust-inhibiting and corrosion-resisting agent may be one or more selected from the group consisting of a fluorine-based rust inhibitor, a vanadium-based rust inhibitor, a cerium salt-based rust inhibitor, and a cobalt-based rust inhibitor.

In the manufacturing method for a surface-treated zinc-based plated steel sheet, the molybdenum-based compound may be one or more selected from the group consisting of molybdenum oxide, molybdenum sulfide, molybdenum acetate, molybdenum phosphate, molybdenum carbide, molybdenum chloride, molybdenum fluoride, and molybdenum nitride.

In the manufacturing method for a surface-treated zinc-based plated steel sheet, the silane coupling agent may be one or more selected from the group consisting of 2-(3,4-epoxycyclohexyl)-ethyl trimethoxysilane, 3-glycidoxypropyl trimethoxysilane, 3-glycidoxypropyl methyldiethoxysilane, 3-glycidoxypropyl triethoxysilane, N-2-(aminoethyl)-3-aminopropyl methyldimethoxysilane, N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, 3-ureidopropyl trimethoxysilane, and 3-ureidopropyl trialkoxysilane.

In the manufacturing method for a surface-treated zinc-based plated steel sheet, the solution composition for steel sheet surface treatment may be coated to a thickness of 2.14 μm to 3.57 μm.

In the manufacturing method for a surface-treated zinc-based plated steel sheet, the coating may be performed by any one method selected from the group consisting of roll coating, spraying, immersion, spray squeezing, and immersion squeezing.

In the manufacturing method for a surface-treated zinc-based plated steel sheet, the drying may be performed at a temperature of 50 to 60° C. on the basis of a Peak Metal Temperature (PMT) of a steel sheet.

In the manufacturing method for a surface-treated zinc-based plated steel sheet, the drying may be performed in a hot-air drying furnace or an induction heating furnace.

In the manufacturing method for a surface-treated zinc-based plated steel sheet, the hot-air drying furnace may have an internal temperature of 100 to 200° C.

In the manufacturing method for a surface-treated zinc-based plated steel sheet, the induction heating furnace may be applied with an electric current of 1000 A to 3500 A.

The manufacturing method for a surface-treated zinc-based plated steel sheet may further include air-cooling the trivalent chromate film layer.

In the manufacturing method for a surface-treated zinc-based plated steel sheet, the manufacturing method may be a continuous process, wherein the continuous process may have a speed of 80 mpm to 100 mpm.

Advantageous Effects

According to an aspect of the present disclosure, the zinc-based plated steel sheet surface-treated with the solution composition for steel sheet surface treatment containing trivalent chromium may have an excellent effect on corrosion resistance, blackening resistance, fingerprint resistance, oil resistance, and alkali resistance.

BEST MODE FOR INVENTION

Hereinafter, preferred embodiments of the present disclosure will be described with reference to various embodiments. However, embodiments of the present disclosure may be modified into various other embodiments, and the scope of the present disclosure may be not limited to embodiments described below.

The present disclosure relates to a solution composition for steel sheet surface treatment containing trivalent chromium, a zinc-based plated steel sheet surface-treated with the solution composition, and a manufacturing method for the zinc-based plated steel sheet.

The solution composition for a steel sheet surface treatment according to an embodiment of the present disclosure may include: 30 wt % to 60 wt % of a trivalent chromium compound containing chromium phosphate (A) and chromium nitrate (B); 0.2 wt % to 0.4 wt % of a rust-inhibiting and corrosion-resisting agent; 0.1 wt % to 0.3 wt % of a molybdenum-based compound; 5 wt % to 10 wt % of a water-soluble cationic urethane resin; 0.5 wt % to 2.0 wt % of a silane coupling agent; and 27.3 wt % to 64.2 wt % of water.

The zinc-based plated steel sheet surface-treated with the solution composition for steel sheet surface treatment containing trivalent chromium according to an embodiment of the present disclosure may have an excellent effect on corrosion resistance, blackening resistance, fingerprint resistance, oil resistance, and alkali resistance. In addition, damage to the human body and environmental pollution may be prevented, by containing trivalent chromium as a main component, harmless to the human body, without an inclusion of hexavalent chromium, an environmentally hazardous substance.

The trivalent chromium compound may be a component contained as a main component in the solution composition for steel sheet surface treatment according to an embodiment of the present disclosure, may have a self-healing effect and self-lubricating properties similar to hexavalent chromium, and may function to secure corrosion resistance and blackening resistance. The trivalent chromium compound contained in the composition of the present disclosure may include chromium phosphate (A) and chromium nitrate (B).

As the ratio of chromium phosphate increases, corrosion resistance may be improved, while blackening resistance may be deteriorated. Meanwhile, as the chromium nitrate ratio increases, blackening resistance may be improved, while corrosion resistance may be deteriorated. In particular, when the film is formed with the chromium phosphate, a phosphoric acid component may not be volatilized. Therefore, a chromium phosphate film may be formed on a surface of the film, and corrosion resistance may be improved. However, blackening resistance of the chromium phosphate may be deteriorated due to a hygroscopic property of the chromium phosphate. Meanwhile, when the film is formed with the chromium nitrate, a nitric acid component may be mostly volatilized and may not affect blackening resistance. However, as the content of chromium nitrate increases, the film of chromium phosphate may be hardly formed on a surface of the film, and corrosion resistance may be deteriorated Therefore, according to one embodiment of the present disclosure, the content ratio A/(A+B) of the chromium phosphate (A) and the chromium nitrate (B) may satisfy 0.3 to 0.6. When the content ratio is less than 0.3, corrosion resistance after processing may be deteriorated. When the content ratio exceeds 0.6, blackening resistance may be deteriorated.

The total content of the trivalent chromium compound containing chromium phosphate (A) and chromium nitrate (B) is preferably 30 wt % to 60 wt %. When the content of the trivalent chromium compound is less than 30 wt %, a firm and insoluble film layer may become thinner. Therefore, since it may be difficult to effectively block penetration of moisture through a surface of the plated steel sheet requiring corrosion resistance, blackening may be caused and corrosion resistance may also be deteriorated. Meanwhile, when the content of the trivalent chromium compound exceeds 60 wt %, the content of the rust inhibitor to be added for improving corrosion resistance, the content of the water-soluble cationic urethane resin serving as a binder, and the content of the silane coupling agent may be relatively decreased. Therefore, there may be a problem in which it is difficult to secure sufficient corrosion resistance and blackening resistance.

The rust-inhibiting and corrosion-resisting agent may be included for improving corrosion resistance of the zinc-based plated steel sheet surface-treated with the solution composition for steel sheet surface treatment of the present disclosure. Preferably, the rust-inhibiting and corrosion-resisting agent may be one or more selected from the group consisting of a fluorine-based rust inhibitor, a vanadium-based rust inhibitor, a cerium salt-based rust inhibitor, and a cobalt-based rust inhibitor.

The content of the rust-inhibiting and corrosion-resisting agent is preferably 0.2 wt % to 0.4 wt %. When the content of the rust-inhibiting and corrosion-resisting agent is less than 0.2 wt %, there may be a problem in which it is difficult to secure corrosion resistance. When the content of the rust-inhibiting and corrosion-resisting agent exceeds 0.4 wt %, there may be a problem in which it is difficult to secure blackening resistance and alkali resistance.

The molybdenum-based compound may be added to improve blackening resistance of the zinc-based plated steel sheet surface-treated with the solution composition for steel sheet surface treatment according to the present disclosure. The molybdenum-based compound may be one or more selected from the group consisting of molybdenum oxide, molybdenum sulfide, molybdenum acetate, molybdenum phosphate, molybdenum carbide, molybdenum chloride, molybdenum fluoride, and molybdenum nitride.

The content of the molybdenum-based compound is preferably 0.1 wt % to 0.3 wt %. When the content of the molybdenum-based compound is less than 0.1 wt %, there may be a problem in which it is difficult to secure blackening resistance. When the content of the molybdenum-based compound exceeds 0.3 wt %, an effect of improving blackening resistance may be insignificant, and corrosion resistance may be greatly deteriorated.

The water-soluble cationic urethane resin may be added for formation of a firm film layer of the zinc-based plated steel sheet surface-treated with the solution composition for steel sheet surface treatment of the present disclosure. The water-soluble cationic urethane resin may improve a film-forming action which may be insufficient only by inorganic components, to form a firm film layer. Therefore, alkali resistance, oil resistance, and fingerprint resistance may be improved.

The content of the water-soluble cationic urethane resin is preferably 5 wt % to 10 wt %. When the content of the water-soluble cationic urethane resin is less than 5 wt %, the film-forming action may be deteriorated not to form a firm film layer. Therefore, it may be difficult to secure alkali resistance, oil resistance, and fingerprint resistance. When the content of the water-soluble cationic urethane resin exceeds 10 wt %, the content of the trivalent chromium compound is relatively reduced. Therefore, corrosion resistance and blackening resistance property may be reduced, which is not preferable.

The silane coupling agent may be added to crosslink the inorganic component and the organic component, to promote drying, and to ensure high corrosion resistance. The type of the silane coupling agent is not particularly limited, and, for examples, may be one or more selected from the group consisting of 2-(3,4-epoxycyclohexyl)-ethyl trimethoxysilane, 3-glycidoxypropyl trimethoxysilane, 3-glycidoxypropyl methyldiethoxysilane, 3-glycidoxypropyl triethoxysilane, N-2-(aminoethyl)-3-aminopropyl methyldimethoxysilane, N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, 3-ureidopropyl trimethoxysilane, and 3-ureidopropyl trialkoxysilane.

The content of the silane coupling agent is preferably 0.5 wt % to 2.0 wt %. When the content of the silane coupling agent is less than 0.5 wt %, alkali resistance and oil resistance may be deteriorated. When the content of the silane coupling agent exceeds 2.0 wt %, the film may become too dry to form an excessively hard film. Therefore, processed part corrosion resistance may be reduced, and oil resistance may be deteriorated.

The water may be a solvent for the solution composition for steel sheet surface treatment of the present disclosure. The water may be used for diluting resins. The water refers to deionized water or distilled water. The solvent may be contained as a remainder in addition to the respective components of the present disclosure, and the content thereof is preferably 27.3 wt % to 64.2 wt %.

According to another embodiment of the present disclosure, a zinc-based plated steel sheet surface-treated with the above-described solution composition for steel sheet surface treatment containing trivalent chromium, and a manufacturing method for the same may be provided.

Specifically, the surface-treated zinc-based plated steel sheet may include a steel sheet, a zinc-based plated layer formed on at least one surface of the steel sheet, and a trivalent chromate film layer formed on the zinc-based plated layer. The trivalent chromate film layer may include 78.45 wt % to 82.3 wt % of a trivalent chromium compound containing chromium phosphate (A) and chromium nitrate (B); 1.69 wt % to 1.77 wt % of a rust-inhibiting and corrosion-resisting agent; 0.885 wt % to 1.265 wt % of a molybdenum-based compound; 10.125 wt % to 10.62 wt % of a urethane resin; and 4.425 wt % to 8.44 wt % of a silane coupling agent. Further, the trivalent chromium compound may include chromium phosphate (A) and chromium nitrate (B), and the content ratio A/(A+B) therebetween may satisfy 0.89 to 0.95.

The trivalent chromate film layer may be a coating layer on which the above-described solution composition for steel sheet surface treatment is dried, and may correspond to components remaining after volatile substances contained in the trivalent chromate film layer are all volatilized. As a result, the trivalent chromate film layer may not contain water as a solvent, and may not include water contained in the trivalent chromate compound and the urethane resin. Therefore, the components contained in the trivalent chromate film layer may correspond to amounts based on 100 wt % of the total solids content.

The trivalent chromium compound may include chromium phosphate (A) and chromium nitrate (B), and the content thereof may be 78.45 wt % to 82.3 wt % based on the solids content. When the content of the trivalent chromium compound is less than 78.45 wt %, a firm and insoluble film layer may become thinner. Therefore, since it may be difficult to effectively block penetration of moisture through a surface of the plated steel sheet requiring corrosion resistance, blackening may be caused and corrosion resistance may also be deteriorated. Meanwhile, when the content of the trivalent chromium compound exceeds 82.3 wt %, the content of the rust inhibitor to be added for improving corrosion resistance, the content of the water-soluble cationic urethane resin serving as a binder, and the content of the silane coupling agent may be relatively decreased. Therefore, there may be a problem in which it is difficult to secure sufficient corrosion resistance and blackening resistance.

The chromium phosphate (A) and chromium nitrate (B) may satisfy a content ratio A/(A+B) of 0.89 to 0.95. When the content ratio is less than 0.89, corrosion resistance after processing may be reduced. When the content ratio exceeds 0.95, blackening resistance may be reduced.

In the solution composition for steel sheet surface treatment, the chromium phosphate (A) and the chromium nitrate (B) may satisfy a content ratio A/(A+B) of 0.3 to 0.6. The chromium phosphate and chromium nitrate may contain a relatively large amount of water. The content ratio of the chromium phosphate (A) and the chromium nitrate (B) contained in the film layer may be within a range of 0.89 to 0.95 by way of removing water in operations of coating and drying the solution composition for steel surface treatment on the zinc-based plated steel sheet to form a film layer.

The content of the rust-inhibiting and corrosion-resisting agent is preferably 1.69 wt % to 1.77 wt % based on the solids content. When the content of the rust-inhibiting and corrosion-resisting agent is less than 1.69 wt %, there may be a problem in which it is difficult to secure corrosion resistance. When the content of the rust-inhibiting and corrosion-resisting agent exceeds 1.77 wt %, there may be a problem in which it is difficult to secure blackening resistance and alkali resistance. Meanwhile, the content of the molybdenum-based compound is preferably 0.885 wt % to 1.265 wt %, based on the solids content. When the content of the molybdenum-based compound is less than 0.885 wt %, there may be a problem in which it is difficult to secure blackening resistance. When the content of the molybdenum-based compound exceeds 1.265 wt %, an effect of improving blackening resistance may be insignificant, and corrosion resistance may be greatly deteriorated.

The content of the urethane resin is preferably 10.125 wt % to 10.62 wt % based on the solids content. When the content of the water-soluble cationic urethane resin is less than 10.125 wt %, the film-forming action may be deteriorated to form a firm film layer. Therefore, there may be a problem in which it difficult to secure alkali resistance, oil resistance and fingerprint resistance. When the content of the water-soluble cationic urethane resin exceeds 10.62 wt %, the content of the trivalent chromium compound may be relatively reduced, and corrosion resistance and blackening resistance property may be reduced, which is not preferable. Meanwhile, the solution composition for steel sheet surface treatment according to the present disclosure may contain a water-soluble cationic urethane resin. The water-soluble cationic urethane resin may be detected as a urethane resin, not in a cationic state thereof, through a coating-drying process on the zinc-based plated steel sheet.

The content of the silane coupling agent is preferably 4.425 wt % to 8.44 wt %. When the content of the silane coupling agent is less than 4.425 wt %, alkali resistance and oil resistance may be deteriorated. When the content of the silane coupling agent exceeds 8.44 wt %, the film may become too dry to form an excessively hard film. Therefore, a processed part corrosion resistance may be reduced, and oil resistance may be deteriorated.

Meanwhile, the zinc-based plated layer may be a zinc-magnesium-aluminum alloy layer having high corrosion resistance. The zinc-magnesium-aluminum alloy layer may include 1.5 wt % to 4 wt % of magnesium (Mg), 1 wt % to 3 wt % of aluminum (Al), a remainder of zinc (Zn), and unavoidable impurities. It is preferable to satisfy 2.5 wt % to 7.0 wt % of Al+Mg, and 0.38 to 0.48 of Al/(Al+Mg).

When the content of Mg does not satisfy 1.5 wt % to 4.0 wt %, the effect of improving corrosion resistance may not be sufficient. Meanwhile, when the content of Al is less than 1%, the effect of improving corrosion resistance may be insufficient. When the content of Al exceeds 3%, the Fe elution of the base steel sheet may increase, and the weldability and the phosphate treatment ability of the plated layer may be reduced.

The Al and Mg may be elements that improve corrosion resistance of the plated layer. As the sum of these elements increases, corrosion resistance may be improved. When the sum of aluminum and magnesium is less than 2.5%, the effect of improving corrosion resistance may be insufficient. When the sum of aluminum and magnesium exceeds 7.0%, corrosion resistance may be improved, but hardness of the plated layer may be increased to promote an occurrence of cracking in a processed part, and weldability and paintability may be deteriorated.

Meanwhile, when the Al/(Mg+Al) is less than 0.38, defects of the plated layer may occur, and a coarse $MgZn_2$ phase may be formed in the plated layer to coarsen a surface of the plated layer. When the Al/(Mg+Al) exceeds 0.48, a relatively large amount of Zn single phase may be formed on the plated layer, and corrosion resistance may be reduced.

According to an embodiment of the present disclosure, there may be provided a manufacturing method for a zinc-based plated steel sheet, comprising: preparing a zinc-based plated steel sheet on which a zinc-based plated layer is formed; coating the solution composition for steel sheet surface treatment on the zinc-based plated layer; and drying the coated solution composition for steel sheet surface treatment to form a trivalent chromate film layer.

The zinc-based plated layer may be a zinc-magnesium-aluminum alloy layer having high corrosion resistance. The zinc-magnesium-aluminum alloy layer may include 1.5 wt % to 4 wt % of magnesium (Mg), 1 wt % to 3 wt % of aluminum (Al), a remainder of zinc (Zn), and unavoidable impurities. It is preferable to satisfy 2.5 wt % to 7.0 wt % of Al+Mg, and 0.38 to 0.48 of Al/(Al+Mg).

The solution composition for steel sheet surface treatment may include: 30 wt % to 60 wt % of a trivalent chromium compound containing chromium phosphate (A) and chromium nitrate (B); 0.2 wt % to 0.4 wt % of a rust-inhibiting and corrosion-resisting agent; 0.1 wt % to 0.3 wt % of a molybdenum-based compound; 5 wt % to 10 wt % of a water-soluble cationic urethane resin; 0.5 wt % to 2.0 wt % of a silane coupling agent; and 27.3 wt % to 64.2 wt % of water. The chromium phosphate (A) and chromium nitrate (B) may satisfy a content ratio A/(A+B) of 0.3 to 0.6. The technical meaning of the content range of each component contained in the solution composition for steel sheet surface treatment may be as described above.

According to an embodiment of the present disclosure, the solution composition for steel sheet surface treatment is coated to a thickness of 2.14 μm to 3.57 μm. The solution composition for steel sheet surface treatment coated to such a thickness may be a thickness of the dried coating layer of 0.3 μm to 0.5 μm through the drying operation. When a thickness of the solution composition for steel sheet surface treatment is less than 2.14 μm, there may arise a problem in which the solution composition for steel sheet surface treatment may be applied thinly on the peak portion of the roughness of the steel sheet to reduce corrosion resistance. When a thickness of the solution composition for steel sheet surface treatment exceeds 3.57 μm, weldability and workability may be deteriorated.

The method of coating the solution composition for steel sheet surface treatment is not particularly limited as long as it is a commonly used coating method. For example, it is preferable to perform any one coating method selected from roll coating, spraying, immersion, spray squeezing, and immersion squeezing.

It is preferable that the drying the solution composition for steel sheet surface treatment coated on the zinc-based plated steel sheet is performed at a temperature of 50 to 60° C. on the basis of a Peak Metal Temperature (PMT) of a steel sheet. When the drying temperature is less than 50° C. on the basis of a Peak Metal Temperature (PMT) of a steel sheet, the drying may not be performed perfectly, and alkali resistance and oil resistance may be deteriorated. When the drying temperature exceeds 60° C., the steel sheet may be not sufficiently cooled during the cooling process (air cooling) in air, and blackening resistance may be deteriorated due to the condensation phenomenon by a packaging operation.

Meanwhile, the drying operation is preferably carried out in a hot-air drying furnace or an induction heating furnace. When a coating composition for surface treatment of steel sheet is dried using the hot-air drying furnace, the hot-air drying furnace preferably has an internal temperature of 100 to 200° C. Meanwhile, when a coating composition for surface treatment of steel sheet is dried using the induction heating furnace, an electric current applied to the induction heating furnace is preferably 1000 A to 3500 A, and more preferably 1500 A to 3000 A. When an internal temperature of the hot-air drying furnace is less than 100° C. or the electric current applied to the induction heating furnace is less than 1000 A, the coating composition for surface treatment of the steel sheet may not be completely dried, and alkali resistance and oil resistance may be deteriorated. When an internal temperature of the hot-air drying furnace is less than 200° C. or the electric current applied to the induction heating furnace exceeds 3500 A, the steel sheet may be not sufficiently cooled during the cooling process (air cooling) in air, and blackening resistance may be deteriorated due to the condensation phenomenon by a packaging operation.

In addition, a zinc-based plated steel sheet, which is finally surface-treated by drying the solution composition for steel sheet surface treatment to form a trivalent chromate film layer and air-cooling the trivalent chromate film layer, may be provided.

The manufacturing method for the zinc-based steel sheet according to an embodiment of the present disclosure may be a continuous process, and a speed of the continuous process is preferably 80 mpm to 100 mpm. When a speed of the continuous process is less than 80 mpm, a problem in which productivity is reduced may occur. When a speed of the continuous process exceeds 100 mpm, a solution may be scattered in the drying operation of the solution composition for steel sheet surface treatment, and thereby surface defects may occur.

MODE FOR INVENTION

Hereinafter, the present disclosure will be described more specifically with reference to specific examples. The following examples are provided to aid understanding of the present disclosure, and the scope of the present disclosure is not limited thereto.

EXAMPLE

1. Change in Properties According to Content of Trivalent Chromium Compound

A solution composition for steel sheet surface treatment containing trivalent chromium according to the present disclosure includes chromium nitrate and chromium phosphate as a trivalent chromium compound; a cobalt-based rust inhibitor as a rust-inhibiting and corrosion-resisting agent;

molybdenum chloride as a molybdenum-based compound; a water-soluble cationic urethane resin (a urethane resin having a cation, which may be used in an acidic state); N-2-(aminoethyl)-3-aminopropyl methyldimethoxysilane and 3-ureidopropyl trimethoxysilane (1:1 mixture) as a silane coupling agent; and water. The components were mixed in the amounts shown in Table 2 below (based on the solids content of the composition).

In the following examples, cases in which the solution composition for steel sheet surface treatment according to the present disclosure satisfies the specified content range shown in Table 1 below were described as Inventive Examples. Meanwhile, cases in which one or more components do not satisfy the specified content range shown in Table 1 were described as Comparative Examples.

In addition, the content of each component shown in Tables 2 to 8 below was described based on "solids content." The content of each component was described, based on 100% of the solids content which remains after the removal of water contained in the trivalent chromium compound and the water-soluble cationic urethane resin in the form of a dry film, in addition to removal of water as a solvent contained in the solution composition of the present disclosure in the form of a dry film.

TABLE 1

| Range of Composition | Solution Component (wt %) | | Solid of Raw Material (wt %) | Component After Drying (wt %) | | Component in Dry Film (wt %) | |
|---|---|---|---|---|---|---|---|
| | Min. | Max. | | Min. | Max. | Min. | Max. |
| Trivalent Chromium Compound | 30 | 60 | 31 | 9.3 | 18.6 | 78.45 | 82.3 |
| Rust-Inhibiting and Corrosion-Resisting Agent | 0.2 | 0.4 | 100 | 0.2 | 0.4 | 1.69 | 1.77 |
| Molybdenum-based Compound | 0.1 | 0.3 | 100 | 0.1 | 0.3 | 0.885 | 1.265 |
| Water-Soluble Cationic Urethane Resin | 5 | 10 | 24 | 1.2 | 2.4 | 10.125 | 10.62 |
| Silane Coupling Agent | 0.5 | 2 | 100 | 0.5 | 2 | 4.425 | 8.44 |
| Water | 64.2 | 27.3 | 0 | 0 | 0 | 0 | 0 |
| Total | 100 | 100 | — | 11.3 | 23.7 | 100 | 100 |

A high corrosion resistant molten zinc-based plated steel sheet (Zn—Al—Mg) was cut to have a size of 7 cm×15 cm (width×length), and oil was removed therefrom. Then, a solution composition for steel sheet surface treatment containing trivalent chromium, prepared in Table 2, was bar-coated in a dry film layer thickness of 0.4 μm, and dried under conditions of PMT 60 to prepare specimens.

Flat sheet corrosion resistance, processed part corrosion resistance, and blackening resistance of the prepared specimens were evaluated. The evaluation results were shown in Table 2. The evaluation methods for flat sheet corrosion resistance, processed part corrosion resistance, and blackening resistance were as follows.

<Flat Sheet Corrosion Resistance>

Based on the method specified in ASTM B117, the rate of occurrence of white rust in the steel sheet was measured over time after the specimens were treated. The evaluation criteria are as follows:

⊚: 144 hours or more of white rust occurrence time

○: 96 hours or more and less than 144 hours of white rust occurrence time

Δ: less than 55 hours or more and less than 96 hours of white rust occurrence time X: Less than 55 hours of white rust occurrence time <Processed Part Corrosion Resistance>

The specimens were pushed up to a height of 6 mm using an Erichsen tester, and a frequency of occurrence of white rust was measured after 24 hours. The evaluation criteria are as follows:

⊚: Less than 5% of a frequency of occurrence of white rust after 24 hours

Δ: 5% or more and less than 7% of a frequency of occurrence of white rust after 24 hours X: Greater than 7% of a frequency of occurrence of white rust after 24 hours <Blackening Resistance>

The color change (color difference: ΔE) of the specimens before and after the test was observed by allowing the specimens in an air-conditioning equipment maintaining at 50° C. and a relative humidity of 95% for 120 hours. The evaluation criteria are as follows:

⊚: ΔE≤2

○: 2<ΔE≤3

Δ: 3<ΔE≤4

X: ΔE>4

TABLE 2

| | Composition (wt %) | | | | | | | |
|---|---|---|---|---|---|---|---|---|
| | Trivalent Chromium Compound | Rust-Inhibiting and Corrosion Resisting Agent | Molybdenum-based Compound | Urethane Resin | Silane Coupling Agent | Flat Sheet Corrosion Resistance | Processed Part Corrosion Resistance | Blackening Resistance |
| [1]CE1 | 47.47 | 4.59 | 3.06 | 25.73 | 19.15 | X | X | X |
| [2]IE1 | 78.48 | 1.77 | 1.265 | 10.62 | 7.865 | ○ | ⊚ | ○ |
| IE2 | 79.59 | 1.72 | 1.12 | 10.21 | 7.36 | ⊚ | ⊚ | ⊚ |
| IE3 | 81.88 | 1.70 | 0.98 | 10.2 | 5.24 | ⊚ | ⊚ | ⊚ |
| IE4 | 82.30 | 1.69 | 0.885 | 10.125 | 5.00 | ○ | ⊚ | ○ |
| CE2 | 87.85 | 1.06 | 0.71 | 5.95 | 4.43 | X | X | ○ |

[1]CE: Comparative Example,

[2]IE: Inventive Example

* The content of the composition is based on 14% of the solids content

As shown in Table 2 above, when the content of the trivalent chromium compound satisfied the content proposed by the present disclosure (Inventive Examples 1 to 4), all of the properties showed good or higher results.

Meanwhile, when the trivalent chromium compound was added in a relatively small amount (Comparative Example 1), flat sheet corrosion resistance, processed part corrosion resistance, and blackening resistance showed poor results. When the trivalent chromium compound was added in a relatively larger amount (Comparative Example 2), all of the properties, except for blackening resistance, showed poor results.

2. Change in Properties According to Ratios of Chromium Phosphate (III) and Chromium Nitrate (III) Contained in Trivalent Chromium Compound Solution compositions for steel sheet surface treatment containing trivalent chromium according to Inventive Example 3 were used, except that ratios of chromium phosphate (III) and chromium nitrate (III) phosphate were controlled to the ratios of chromium phosphate and chromium nitrate as shown in Table 3.

Specifically, a chromium phosphate compound and chromium nitrate were added to distilled water, reacted at 80V for 1 hour, and then cooled to room temperature to prepare a trivalent chromium compound (chromium phosphate (A) and chromium nitrate (B)). At this time, the content of each component was controlled such that ratios of the chromium phosphate and chromium nitrate satisfied the specified ratios shown in Table 3 below.

A high corrosion resistant molten zinc-based plated steel sheet (Zn—Al—Mg) was cut to have a size of 7 cm×15 cm (width×length), and oil was removed therefrom. Then, a solution composition for steel sheet surface treatment containing trivalent chromium, prepared in Table 3, was bar-coated in a dry film layer thickness of 0.4 μm, and dried under conditions of PMT 60 to prepare specimens.

Flat sheet corrosion resistance and blackening resistance of the prepared specimens were evaluated. The evaluation results were shown in Table 3. The evaluation methods of flat sheet corrosion resistance and blackening resistance are as follows.

TABLE 3

| | Trivalent Chromium Compound (wt %) | Content Ratio of Chromium Phosphate and Chromium Nitrate | | Flat Sheet Corrosion Resistance | Blackening Resistance |
|---|---|---|---|---|---|
| | | Chromium Phosphate | Chromium Nitrate | | |
| [1]CE3 | 81.88 | 7 | 0 | ○ | X |
| CE4 | 81.88 | 0 | 0.35 | X | ○ |
| CE5 | 81.88 | 1 | 0.3 | X | ○ |
| [2]IE5 | 81.88 | 2 | 0.25 | ○ | ⊚ |
| IE6 | 81.88 | 3 | 0.2 | ⊚ | ⊚ |
| IE7 | 81.88 | 4 | 0.2 | ⊚ | ○ |
| CE6 | 81.88 | 5 | 0.1 | ○ | X |

[1]CE: Comparative Example,
[2]IE: Inventive Example
* The content of the composition is based on 14% of the solids content As shown in Table 3 above, corrosion resistance may be improved as a ratio of chromium phosphate is increased, while blackening resistance may be improved as a ratio of chromium nitrate is increased. It has been confirmed that corrosion resistance or blackening resistance shows an effect of moderate (Δ), when a ratio of chromium phosphate to chromium nitrate did not satisfy those described in the present disclosure.

3. Change in Properties Depending on Content of Rust-Inhibiting and Corrosion-Resisting Agent A solution composition for steel sheet surface treatment containing trivalent chromium according to the present disclosure includes chromium nitrate and chromium phosphate as a trivalent chromium compound; a cobalt-based rust inhibitor as a rust-inhibiting and corrosion-resisting agent; molybdenum chloride as a molybdenum-based compound; a water-soluble cationic urethane resin (a urethane resin having a cation, which may be used in an acidic state); and N-2-(aminoethyl)-3-aminopropyl methyldimethoxysilane and 3-ureidopropyl trimethoxysilane (1:1 mixture) as a silane coupling agent. The components were mixed in the amounts shown in Table 4 below (based on the solids content of the composition).

A high corrosion resistant molten zinc-based plated steel sheet (Zn—Al—Mg) was cut to have a size of 7 cm×15 cm (width×length), and oil was removed therefrom. Then, a solution composition for steel sheet surface treatment containing trivalent chromium, prepared in Table 4, was bar-coated in a dry film layer thickness of 0.4 μm, and dried under conditions of PMT 60 to prepare specimens.

Flat sheet corrosion resistance, processed part corrosion resistance, blackening resistance, and alkali resistance of the prepared specimens were evaluated. The evaluation results were shown in Table 4. The evaluation methods of flat sheet corrosion resistance, processed part corrosion resistance, and blackening resistance are as described above, and the evaluation method of alkali resistance is as follows.

<Alkali Resistance>

The specimens were immersed in an alkaline degreasing solution at 60° C. for 2 minutes, washed with water, air blown, and then measured with regard to a difference in color before and after the operations. The alkali degreasing solution was Finecleaner L 4460 A: 20 g/2.4 L+L 4460 B 12 g/2.4 L (pH=12) manufactured by Parkerizing Co., Ltd. The evaluation criteria are as follows:

⊚: ΔE≤2

○: 2<ΔE≤3

Δ: 3<ΔE≤4

X: ΔE>4

TABLE 4

| | Composition (wt %) | | | | | | | |
|---|---|---|---|---|---|---|---|---|
| | Rust-Inhibiting and Corrosion-Resisting Agent | Trivalent Chromium Compound | Molybdenum-based Compound | Urethane Resin | Silane Coupling Agent | Flat Sheet Corrosion Resistance | Processed Part Corrosion Resistance | Blackening Resistance | Alkali Resistance |
| ¹CE7 | 0.58 | 81.2 | 1.16 | 9.78 | 7.28 | X | X | ⊚ | ⊚ |
| ²IE8 | 1.69 | 79.39 | 1.16 | 10.62 | 7.14 | ○ | ⊚ | ⊚ | ⊚ |
| IE9 | 1.72 | 79.52 | 1.15 | 10.42 | 7.19 | ○ | ⊚ | ⊚ | ⊚ |
| IE10 | 1.77 | 79.81 | 1.14 | 10.13 | 7.15 | ⊚ | ⊚ | ○ | ○ |
| CE8 | 2.84 | 79.35 | 1.14 | 9.56 | 7.11 | ⊚ | ⊚ | ○ | X |
| CE9 | 5.53 | 77.16 | 1.11 | 9.29 | 6.91 | ⊚ | ⊚ | X | X |

¹CE: Comparative Example,
²IE: Inventive Example
* The content of the composition is based on 14% of the solids content As shown in Table 4 above, when the content of the rust-inhibiting and corrosion-resisting agent satisfied the content proposed by the present disclosure (Inventive Examples 12 to 14), all of the properties showed good or higher results.

Meanwhile, when the rust-inhibiting and corrosion-resisting agent was added in a relatively small amount (Comparative Example 3), all the properties, except for blackening resistance and alkali resistance, showed poor results. When the rust-inhibiting and corrosion-resisting agent was added in a relatively large amount (Comparative Examples 4 and 5), all the properties, except for corrosion resistance, showed poor results.

A high corrosion resistant molten zinc-based plated steel sheet (Zn—Al—Mg) was cut to have a size of 7 cm×15 cm (width×length), and oil was removed therefrom. Then, a solution composition for steel sheet surface treatment containing trivalent chromium, prepared in Table 5, was bar-coated in a dry film layer thickness of 0.4 μm, and dried under conditions of PMT 60 to prepare specimens.

Flat sheet corrosion resistance, processed part corrosion resistance, and blackening resistance of the prepared specimens were evaluated. The evaluation results were shown in Table 5. The evaluation methods of flat sheet corrosion resistance, processed part corrosion resistance, and blackening resistance are as described above.

TABLE 5

| | Composition (wt %) | | | | | | | |
|---|---|---|---|---|---|---|---|---|
| | Molybdenum-based Compound | Trivalent Chromium Compound | Rust-Inhibiting and Corrosion-Resisting Agent | Urethane Resin | Silane Coupling Agent | Flat Sheet Corrosion Resistance | Processed Part Corrosion Resistance | Blackening Resistance |
| ¹CE10 | 0.29 | 80.96 | 1.74 | 9.75 | 7.26 | ⊚ | ○ | X |
| ²IE11 | 0.885 | 79.66 | 1.74 | 10.615 | 7.1 | ⊚ | ○ | ○ |
| IE12 | 1.15 | 79.73 | 1.73 | 10.29 | 7.1 | ⊚ | ○ | ○ |
| IE13 | 1.265 | 79.73 | 1.725 | 10.13 | 7.15 | ○ | ○ | ⊚ |
| CE11 | 2.28 | 79.34 | 1.71 | 9.56 | 7.11 | X | X | ⊚ |
| CE12 | 2.83 | 78.9 | 1.7 | 9.5 | 7.07 | X | X | ⊚ |

¹CE: Comparative Example,
²IE: Inventive Example
* The content of the composition is based on 14% of the solids content 4. Change in Properties Depending on Content of Molybdenum-Based Compound A solution composition for steel sheet surface treatment containing trivalent chromium according to the present disclosure includes chromium nitrate and chromium phosphate as a trivalent chromium compound; a cobalt-based rust inhibitor as a rust-inhibiting and corrosion-resisting agent; molybdenum chloride as a molybdenum-based compound; a water-soluble cationic urethane resin (a urethane resin having a cation, which may be used in an acidic state); and N-2-(aminoethyl)-3-aminopropyl methyldimethoxysilane and 3-ureidopropyl trimethoxysilane (1:1 mixture) as a silane coupling agent. The components were mixed in the amounts shown in Table 5 below (based on the solids content of the composition).

As shown in Table 5 above, when the content of the molybdenum-based compound satisfied the content proposed by the present disclosure (Inventive Examples 15 to 17), all of the properties showed good or higher results.

Meanwhile, when the molybdenum-based compound was added in a relatively small amount (Comparative Example 6), blackening resistance showed poor results. When the molybdenum-based compound was added in a relatively large amount (Comparative Examples 7 and 8), corrosion resistance showed poor results. These results confirmed that, when the content of the molybdenum-based compound exceeded the content proposed by the present disclosure, it precipitated from the surface of the steel sheet during the film formation, and the molybdenum-based compound dissolved in the brine solution caused defects in the coating layer.

5. Change in Properties Depending on Content of Urethane Resin

A solution composition for steel sheet surface treatment containing trivalent chromium according to the present disclosure includes chromium nitrate and chromium phosphate as a trivalent chromium compound; a cobalt-based rust inhibitor as a rust-inhibiting and corrosion-resisting agent;

therefrom. The color difference (ΔE) before and after coating with vaseline was observed. The evaluation criteria are as follows:

⊚: ΔE≤2
○: 2<ΔE≤3
Δ: 3<ΔE≤4
X: ΔE>4

TABLE 6

| | Composition (wt %) | | | | | | | | | |
|---|---|---|---|---|---|---|---|---|---|---|
| | Urethane Resin | Trivalent Chromium Compound | Rust-Inhibiting and Corrosion-Resisting Agent | Molybdenum-based Compound | Silane Coupling Agent | Alkali Resistance | Piping Oil Infiltration | Fingerprint Resistance | Flat Sheet Corrosion Resistance | Processed Part Corrosion Resistance | Blackening Resistance |
| ¹CE13 | 4.38 | 84.96 | 1.83 | 1.22 | 7.61 | X | X | X | ○ | X | ○ |
| ²IE14 | 10.13 | 80.3 | 1.77 | 1.21 | 6.59 | ○ | ○ | ○ | ⊚ | ⊚ | ○ |
| IE15 | 10.25 | 80.3 | 1.75 | 1.17 | 6.53 | ○ | ⊚ | ○ | ⊚ | ⊚ | ⊚ |
| IE16 | 10.45 | 80.17 | 1.74 | 1.14 | 6.5 | ⊚ | ⊚ | ⊚ | ○ | ⊚ | ⊚ |
| IE17 | 10.62 | 79.48 | 1.73 | 1.14 | 7.03 | ⊚ | ⊚ | ⊚ | ○ | ⊚ | ○ |
| CE14 | 18.65 | 72.28 | 1.55 | 1.04 | 6.48 | ⊚ | ⊚ | ⊚ | X | X | X |

¹CE: Comparative Example,
²IE: Inventive Example
* The content of the composition is based on 14% of the solids content molybdenum chloride as a molybdenum-based compound; a water-soluble cationic urethane resin (a urethane resin having a cation, which may be used in an acidic state); and N-2-(aminoethyl)-3-aminopropyl methyldimethoxysilane and 3-ureidopropyl trimethoxysilane (1:1 mixture) as a silane coupling agent. The components were mixed in the amounts shown in Table 6 below (based on the solids content of the composition).

A high corrosion resistant molten zinc-based plated steel sheet (Zn—Al—Mg) was cut to have a size of 7 cm×15 cm (width×length), and oil was removed therefrom. Then, a solution composition for steel sheet surface treatment containing trivalent chromium, prepared in Table 6, was bar-coated in a dry film layer thickness of 0.4 μm, and dried under conditions of PMT 60 to prepare specimens.

Flat sheet corrosion resistance, processed part corrosion resistance, blackening resistance, alkali resistance, oil resistance, and fingerprint resistance of the prepared specimens were evaluated. The evaluation results were shown in Table 6. The evaluation methods of flat sheet corrosion resistance, processed part corrosion resistance, blackening resistance, and alkali resistance are as described above, and the evaluation methods of oil resistance and fingerprint resistance are as follows.

<Oil Resistance>

Oil resistance shows that a film layer does not cause performance deterioration due to oil. In order to evaluate oil resistance, the specimens were immersed in oil (i.e., piping oil) at room temperature, maintained for 24 hours, and then the color difference (ΔE) before and after the immersion operation was measured. The piping oil was prepared by diluting BW WELL MP-411, Buhmwoo Chemical Ind. Co. Ltd., in 10% water. The evaluation criteria are as follows:

⊚: ΔE≤2
○: 2<ΔE≤3
Δ: 3<ΔE≤4
X: ΔE>4

<Fingerprint Resistance>

Surfaces of the specimens were coated with vaseline, maintained for 10 minutes, and the vaseline was removed As shown in Table 6 above, when the content of the urethane resin satisfied the content proposed by the present disclosure (Inventive Examples 18 to 21), all of the properties showed good or higher results.

Meanwhile, when the urethane resin was added in a relatively small amount (Comparative Example 9), all of the properties, except for flat sheet corrosion resistance and blackening resistance, showed poor results. When the urethane resin was added in a relatively large amount (Comparative Example 10), processed part corrosion resistance, flat sheet corrosion resistance, and blackening resistance showed poor results.

6. Change in Properties Depending on Content and Type of Silane Coupling Agent

A solution composition for steel sheet surface treatment containing trivalent chromium according to the present disclosure includes chromium nitrate and chromium phosphate as a trivalent chromium compound; a cobalt-based rust inhibitor as a rust-inhibiting and corrosion-resisting agent; molybdenum chloride as a molybdenum-based compound; a water-soluble cationic urethane resin (a urethane resin having a cation, which may be used in an acidic state); and N-2-(aminoethyl)-3-aminopropyl methyldimethoxysilane and 3-ureidopropyl trimethoxysilane (1:1 mixture) as a silane coupling agent. The components were mixed in the amounts shown in Table 7 below (based on the solids content of the composition).

A high corrosion resistant molten zinc-based plated steel sheet (Zn—Al—Mg) was cut to have a size of 7 cm×15 cm (width×length), and oil was removed therefrom. Then, a solution composition for steel sheet surface treatment containing trivalent chromium, prepared in Table 7, was bar-coated to a dry film layer thickness of 0.4 μm, and dried under conditions of PMT 60 to prepare specimens.

Flat sheet corrosion resistance, processed part corrosion resistance, blackening resistance, alkali resistance, oil resistance, and fingerprint resistance of the prepared specimens were evaluated. The evaluation results were shown in Table 7. The evaluation methods of flat sheet corrosion resistance, processed part corrosion resistance, blackening resistance, and alkali resistance are as described above.

TABLE 7

| | Composition (wt %) | | | | | | | | | | |
|---|---|---|---|---|---|---|---|---|---|---|---|
| | Silane Coupling Agent | Trivalent Chromium Compound | Rust-Inhibiting and Corrosion-Resisting Agent | Molybdenum-based Compound | Urethane Resin | Alkali Resistance | Piping Oil InfilTration | FingErprint ResiStance | Flat Sheet Corrosion Resistance | Processed Part Corrosion Resistance | Blackening Resistance |
| [1]CE15 | 0.62 | 85.95 | 1.85 | 1.23 | 10.35 | X | X | ○ | ○ | ◎ | ○ |
| [2]IE18 | 4.425 | 82.3 | 1.77 | 1.2 | 10.305 | ○ | ○ | ○ | ◎ | ◎ | ○ |
| IE19 | 5.84 | 81.04 | 1.75 | 1.17 | 10.2 | ○ | ◎ | ◎ | ◎ | ◎ | ◎ |
| IE20 | 8.41 | 78.61 | 1.7 | 1.13 | 10.15 | ◎ | ◎ | ◎ | ◎ | ◎ | ◎ |
| IE21 | 8.44 | 78.62 | 1.69 | 1.1 | 10.15 | ◎ | ○ | ◎ | ◎ | ◎ | ○ |
| CE16 | 15.68 | 72.92 | 1.57 | 1.05 | 8.78 | ○ | ○ | ○ | ◎ | X | X |
| CE17 | 23.66 | 66.02 | 1.42 | 0.95 | 7.95 | ○ | X | ○ | ◎ | X | X |

[1]CE: Comparative Example,
[2]IE: Inventive Example
* The content of the composition is based on 14% of the solids content As shown in Table 7 above, when the content of the silane coupling agent satisfied the content proposed by the present disclosure (Inventive Examples 22 to 25), all of the properties showed good or higher results.

Meanwhile, when the silane coupling agent was added in a relatively small amount (Comparative Example 11), alkali resistance and oil resistance showed poor results. When the silane coupling agent was added in a relatively large amount (Comparative Examples 12 and 13), the film may become too dry to form a hard film. Therefore, processed part corrosion resistance was reduced, and oil resistance and blackening resistance showed poor results.

The solution composition for steel sheet surface treatment containing trivalent chromium according to Inventive Example 19 was used, but a silane coupling agent was used as the silane coupling agent shown in Table 8 below. As described above, specimens were prepared with the compositions using the silane coupling agents described in Table 8 below, and flat sheet corrosion resistance was evaluated. The results are shown in Table 8.

TABLE 8

| | A [2]Cont. | B Cont. | C Cont. | D Cont. | E Cont. | F Cont. | G Cont. | H Cont. | I Cont. | J Cont. | K Cont. | Flat Sheet Corrosion Resistance |
|---|---|---|---|---|---|---|---|---|---|---|---|---|
| [1]IE22 | 5.84 | 0 | 0 | 0 | 0 | 0 | 0 | 0 | 0 | 0 | 0 | ○ |
| IE23 | 0 | 5.84 | 0 | 0 | 0 | 0 | 0 | 0 | 0 | 0 | 0 | ◎ |
| IE24 | 0 | 0 | 5.84 | 0 | 0 | 0 | 0 | 0 | 0 | 0 | 0 | ○ |
| IE25 | 0 | 0 | 0 | 5.84 | 0 | 0 | 0 | 0 | 0 | 0 | 0 | ◎ |
| IE26 | 0 | 0 | 0 | 0 | 5.84 | 0 | 0 | 0 | 0 | 0 | 0 | ○ |
| IE27 | 0 | 0 | 0 | 0 | 0 | 5.84 | 0 | 0 | 0 | 0 | 0 | ◎ |
| IE28 | 0 | 0 | 0 | 0 | 0 | 0 | 5.84 | 0 | 0 | 0 | 0 | ○ |
| IE29 | 0 | 0 | 0 | 0 | 0 | 0 | 0 | 5.84 | 0 | 0 | 0 | ○ |
| IE30 | 0 | 0 | 0 | 0 | 0 | 0 | 0 | 0 | 5.84 | 0 | 0 | ○ |
| IE31 | 0 | 0 | 0 | 0 | 0 | 0 | 0 | 0 | 0 | 5.84 | 0 | ◎ |
| IE32 | 0 | 0 | 0 | 0 | 0 | 0 | 0 | 0 | 0 | 0 | 5.84 | ○ |
| IE33 | 2.92 | 2.92 | 0 | 0 | 0 | 0 | 0 | 0 | 0 | 0 | 0 | ○ |
| IE34 | 2.92 | 0 | 0 | 2.92 | 0 | 0 | 0 | 0 | 0 | 0 | 0 | ○ |
| IE35 | 0 | 2.92 | 0 | 0 | 0 | 2.92 | 0 | 0 | 0 | 0 | 0 | ◎ |
| IE36 | 0 | 0 | 0 | 2.92 | 0 | 2.92 | 0 | 0 | 0 | 0 | 0 | ○ |
| IE37 | 0 | 0 | 0 | 0 | 2.92 | 0 | 2.92 | 0 | 0 | 0 | 0 | ○ |
| IE38 | 0 | 0 | 0 | 0 | 0 | 2.92 | 0 | 0 | 0 | 2.92 | 0 | ◎ |
| IE39 | 0 | 0 | 2.92 | 0 | 0 | 2.92 | 0 | 0 | 0 | 0 | 0 | ○ |
| IE40 | 0 | 0 | 0 | 0 | 0 | 0 | 2.92 | 0 | 0 | 2.92 | 0 | ○ |
| IE41 | 2.92 | 0 | 0 | 0 | 0 | 0 | 0 | 0 | 0 | 2.92 | 0 | ○ |
| IE42 | 0 | 0 | 0 | 0 | 0 | 0 | 0 | 0 | 0 | 2.92 | 2.92 | ○ |
| IE43 | 0 | 0 | 0 | 2.92 | 0 | 0 | 0 | 0 | 2.92 | 0 | 0 | ○ |
| IE44 | 0 | 0 | 0 | 0 | 2.92 | 0 | 0 | 2.92 | 0 | 0 | 0 | ○ |
| IE45 | 0 | 0 | 0 | 0 | 0 | 0 | 0 | 2.92 | 0 | 0 | 2.92 | ○ |
| IE46 | 0 | 2.92 | 2.92 | 0 | 0 | 0 | 0 | 0 | 0 | 0 | 0 | ◎ |
| IE47 | 0 | 0 | 2.92 | 0 | 0 | 0 | 0 | 0 | 0 | 0 | 2.92 | ○ |
| IE48 | 0 | 0 | 0 | 0 | 0 | 0 | 2.92 | 0 | 2.92 | 0 | 0 | ○ |
| IE49 | 0 | 0 | 0 | 2.92 | 0 | 0 | 0 | 0 | 2.92 | 0 | 0 | ○ |
| IE50 | 0 | 2.92 | 0 | 2.92 | 0 | 0 | 0 | 0 | 0 | 0 | 0 | ◎ |
| IE51 | 0 | 2.92 | 0 | 0 | 0 | 0 | 0 | 0 | 0 | 0 | 2.92 | ○ |
| IE52 | 2.92 | 0 | 2.92 | 0 | 0 | 0 | 0 | 0 | 0 | 0 | 0 | ○ |
| IE53 | 0 | 0 | 0 | 0 | 0 | 0 | 0 | 0 | 2.92 | 2.92 | 0 | ○ |

TABLE 8-continued

| | A ²Cont. | B Cont. | C Cont. | D Cont. | E Cont. | F Cont. | G Cont. | H Cont. | I Cont. | J Cont. | K Cont. | Flat Sheet Corrosion Resistance |
|---|---|---|---|---|---|---|---|---|---|---|---|---|
| IE54 | 0 | 2.92 | 0 | 0 | 2.92 | 0 | 0 | 0 | 0 | 0 | 0 | ◯ |
| IE55 | 0 | 0 | 0 | 0 | 0 | 0 | 2.92 | 2.92 | 0 | 0 | 0 | ◯ |

A: 2-(3,4-epoxycyclohexyl)-ethyl trimethoxysilane
B: 3-glycidoxypropyl trimethoxysilane
C: 3-glycidoxypropyl methyldiethoxysilane
D: 3-glycidoxypropyl triethoxysilane
E: N-2-(aminoethyl)-3-aminopropyl methyldimethoxysilane
F: N-2-(aminoethyl)-3-aminopropyl trimethoxysilane
G: N-2-(aminoethyl)-3-aminopropyl triethoxysilane
H: 3-aminopropyl trimethoxysilane
I: 3-aminopropyl triethoxysilane
J: 3-ureidopropyl trimethoxysilane
K: 3-ureidopropyl trialkoxysilane
¹IE: Inventive Example,
²Cont.: Content
* The content of the composition is based on 14% of the solids content As shown in Table 8 above, Inventive Examples 26 to 59 showed good or excellent flat sheet corrosion resistance. In particular, in the case of the test specimen treated with the solution composition for steel sheet surface treatment containing trivalent chromium prepared according to the composition of Inventive Example 42, an area of white rust generated after 144 hours or more was 0%, which showed the most excellent.

7. Change in Properties According to Thickness of Film Layer and Drying Temperature A high corrosion resistant molten zinc-based plated steel sheet (Zn—Al—Mg) was cut to have a size of 7 cm×15 cm (width×length), and oil was removed therefrom. Then, the composition of Inventive Example 38 was bar-coated, and dried with a hot-air drying furnace to prepare specimens. Thicknesses of the coated film layers and PMT temperatures were controlled to the thicknesses shown in Table 9 below.

Alkali resistance, oil resistance, fingerprint resistance, flat sheet corrosion resistance, processed part corrosion resistance, and blackening resistance of the prepared specimens were evaluated. The evaluation results were shown in Table 9.

TABLE 9

| | Thickness Of Film Layer (μm) | Dry Temp. (° C.) | Alkali Resistance | Piping Oil Infiltration | Fingerprint Resistance | Flat Sheet Corrosion Resistance | Processed Part Corrosion Resistance | Blackening Resistance |
|---|---|---|---|---|---|---|---|---|
| *IE56 | 0.1 | 50 | Δ | Δ | ◯ | Δ | Δ | Δ |
| IE57 | 0.3 | 50 | ⊚ | ⊚ | ⊚ | ⊚ | ⊚ | ⊚ |
| IE58 | 0.4 | 50 | ⊚ | ⊚ | ⊚ | ⊚ | ⊚ | ⊚ |
| IE59 | 0.5 | 50 | ⊚ | ⊚ | ⊚ | ⊚ | ⊚ | ◯ |
| IE60 | 0.8 | 50 | ⊚ | ⊚ | ⊚ | ⊚ | ⊚ | ◯ |
| IE61 | 0.4 | 40 | Δ | Δ | ⊚ | ◯ | ◯ | ◯ |
| IE62 | 0.4 | 60 | ⊚ | ⊚ | ⊚ | ⊚ | ⊚ | ⊚ |
| IE63 | 0.4 | 70 | ⊚ | ⊚ | ⊚ | ⊚ | ⊚ | Δ |

*IE: Inventive Example

As shown in Table 9 above, when the film layer was formed at 0.3 μm to 0.5 μm (Inventive Examples 61 to 63, and 66), all of the properties showed good or higher results.

Meanwhile, when the formed film was too thin (Inventive Example 60), all of the properties, except for fingerprint resistance, showed moderate results (Δ). Meanwhile, when the film was formed too thick (Inventive Example 64), all of the properties showed good or higher results. In this regard, a thicker film than those of Example 63 is not required in an economical view, since the film has no improved properties as compared with Inventive Example 63, Further, as shown in Table 9 above, when the film layer was formed at a drying temperature of the film of 50 to 60° C. (Inventive Examples 61 to 64, and 66), all of the properties showed good or higher results.

When the drying temperature was too low (Inventive Example 65), sufficient drying was not carried out, and alkali resistance and oil resistance showed moderate results (Δ). Meanwhile, when the drying temperature was too high (Inventive Example 67), the steel sheet was not sufficiently cooled during the cooling process (air cooling) in air, and, consequently, blackening resistance showed moderate results (Δ) due to the condensation phenomenon by a packaging operation.

While exemplary embodiments have been shown and described above, it will be apparent to those skilled in the art that modifications and variations could be made without departing from the scope of the present disclosure as defined by the appended claims.

The invention claimed is:

1. A surface-treated zinc-based plated steel sheet comprising:
   a steel sheet;
   a zinc-based plated layer formed on at least one surface of the steel sheet; and
   a trivalent chromate film layer formed on the zinc-based plated layer, wherein the trivalent chromate film layer comprises:
78.45 wt % to 82.3 wt % of a trivalent chromium compound containing chromium phosphate (A) and chromium nitrate (B);
1.69 wt % to 1.77 wt % of a rust-inhibiting and corrosion-resisting agent;
0.885 wt % to 1.265 wt % of a molybdenum-based compound;
10.125 wt % to 10.62 wt % of a urethane resin; and
4.425 wt % to 8.44 wt % of a silane coupling agent.

2. The surface-treated zinc-based plated steel sheet according claim 1, wherein the chromium phosphate (A) and chromium nitrate (B) satisfy a content ratio A/(A+B) of 0.89 to 0.95.

3. The surface-treated zinc-based plated steel sheet according claim 1, wherein the zinc-based plated layer is a zinc-magnesium-aluminum alloy layer.

4. The surface-treated zinc-based plated steel sheet according claim 3, wherein the zinc-magnesium-aluminum alloy layer comprises 1.5 wt % to 4 wt % of magnesium (Mg), 1 wt % to 3 wt % of aluminum (Al), a remainder of zinc (Zn), and unavoidable impurities.

5. The surface-treated zinc-based plated steel sheet according claim 4, wherein the content of aluminum (Al) and magnesium (Mg) satisfy 2.5 wt % to 7.0 wt % of Al+Mg, and 0.38 to 0.48 of Al/(Al+Mg).

6. The surface-treated zinc-based plated steel sheet according claim 1, wherein the trivalent chromate film layer has a thickness of 0.3 μm to 0.5 μm.

* * * * *